Dec. 31, 1968　　C. E. LAMBERT　　3,418,737
ADVERTISING SPECTACLES
Filed Dec. 23, 1966

INVENTOR.
CHARLES E. LAMBERT
BY: MALLINCKRODT & MALLINCKRODT

ATTORNEYS

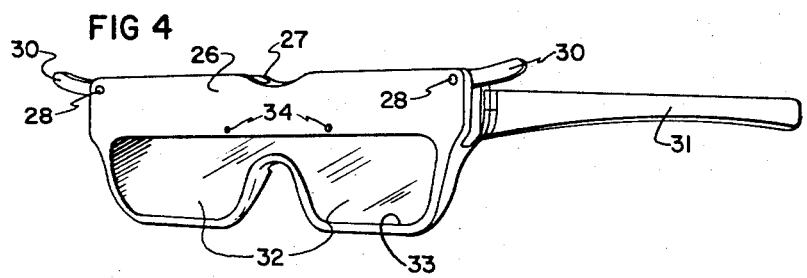
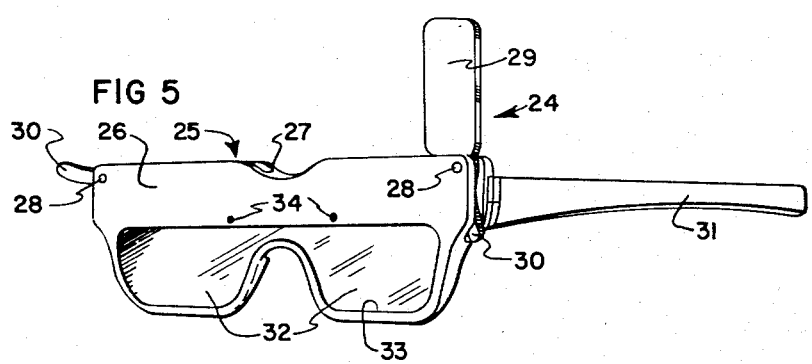
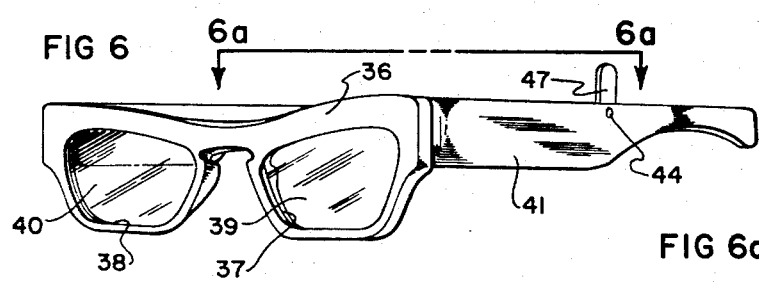
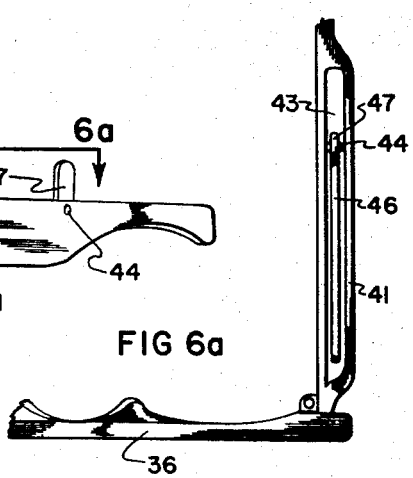
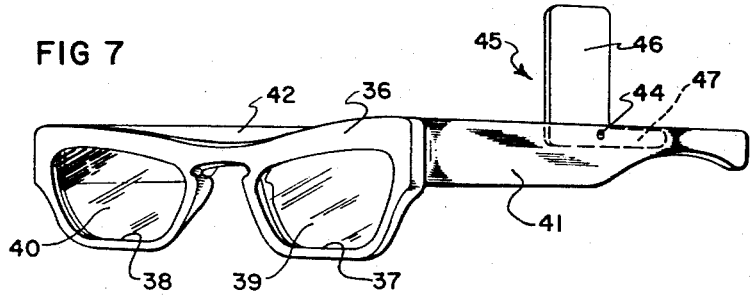

United States Patent Office 3,418,737
Patented Dec. 31, 1968

3,418,737
ADVERTISING SPECTACLES
Charles E. Lambert, 979 Sego Lily Drive,
Sandy, Utah 84070
Filed Dec. 23, 1966, Ser. No. 604,459
7 Claims. (Cl. 40—67)

ABSTRACT OF THE DISCLOSURE

The spectacles of the invention are useful in advertising, as a child's toy and for eye protection. They include a frame, a see-through lens or lenses and normally hidden, movable portions adapted to contain a pertinent sales message, travel data, cartoons, or similar information that can be made visible to the wearer and/or to onlookers through proper manipulation of the movable portions.

BRIEF DESCRIPTION OF THE INVENTION

This invention relates to novelty spectacles and is particularly concerned with those having shaded lenses for use as sunglasses by travelers and others.

A great many inexpensive sunglasses are purchased each year by travelers to protect their eyes from the glare of the sun, especially while they are driving or while they are riding from place to place. These glasses are usually easily broken and do not last long, but in addition to providing temporary relief from glare they frequently serve as an amusement toy for children.

It is an object of the present invention to provide an inexpensive pair of sunglasses that additionally function as a medium of advertising and that will be entertaining, or impart a sales message, travel data, or other desired information to the user and/or to onlookers.

Principal features of the invention are in the construction of the frame of the spectacles. This frame may serve as a lens holder and may also include a pair of temple bars, preferably, but not necessarily, hinged with respect to the lens holder. A portion of the frame serves as a pocket for large, message-bearing portions of one or more plaques, and means are provided for selectively moving the message-bearing portions of the plaques from the pocket to where they can be easily viewed by a user or onlooker.

In one preferred form, the frame is constructed from separate pieces that are easily coupled together, and a plurality of the plaques are adapted to rest in a pocket formed in the lens holder. In another embodiment, the plaques are adapted to rest in a pocket formed in one of the temple bars and it will be apparent that plaques could similarly be mounted to rest in a pocket formed in the other temple bar or that plaques could be mounted to rest in pockets in the lens holder and in one or both temple bars in the same spectacles frame. Obviously, the frame could also be constructed to be attached to existing spectacles, for example, as by clips or an adhesive, in which case the existing lens holder and temple bars of the spectacles would be relied upon by the user.

There are shown in the accompanying drawings specific embodiments of the invention representing what are presently regarded as the best modes of carrying out the generic concepts in actual practice. From the detailed description of these presently preferred forms of the invention, other more specific objects and features will become apparent.

BRIEF DESCRIPTION OF THE DRAWINGS

FIG. 4, a view like FIG. 1, but showing another form of the invention, without an advertising message on the face thereof;

FIG. 5, a view like FIG. 4, but showing one plaque raised;

FIG. 6, a view like FIG. 4, of still another embodiment of the invention; and

FIG. 7, a view like FIG. 5, of the embodiment shown in FIG. 6.

DETAILED DESCRIPTION OF THE INVENTION

Figure 1:
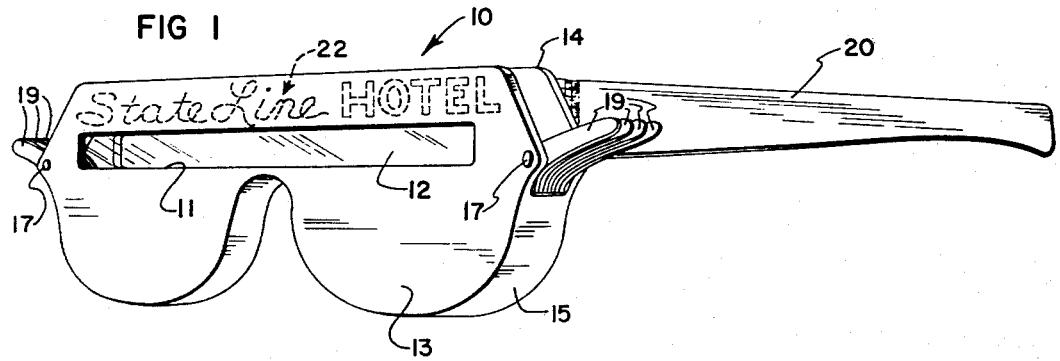
FIG. 1 is a perspective view of one form of the invention, with the plaques shown in their lowered, or hidden position and showing in phantom lines how a typical advertising message can be imprinted across the face of the glasses.
Figure 2:
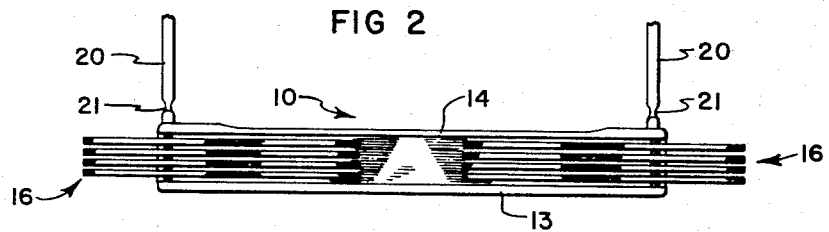
FIG. 2, a top plan view.
Figure 3:
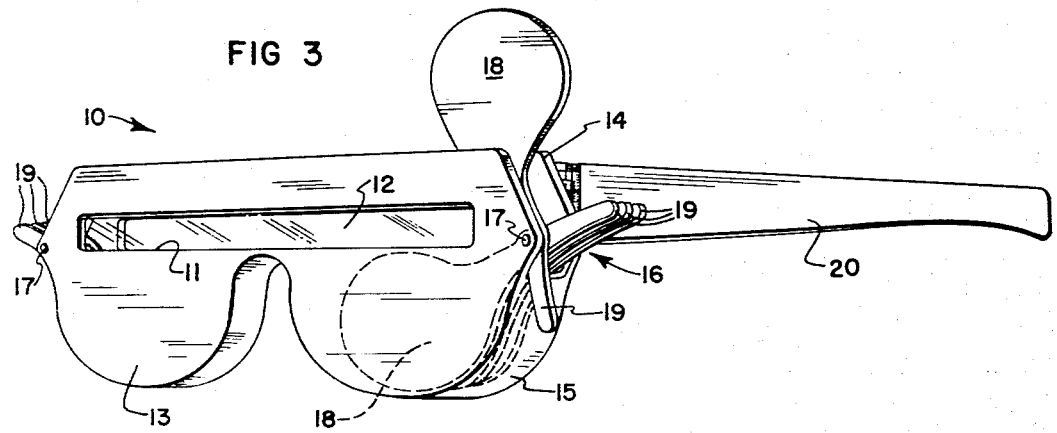
FIG. 3, a view like FIG. 1, but without the advertising message on the face of the glasses, and with one plaque shown in its raised or viewing position, the other plaques being shown in dotted lines in their lowered position.

Referring now to the drawings:

In the embodiment illustrated in FIGS. 1–3, the spectacles of the invention include a lens holder 10. The lens holder includes a cut-out slot portion 11, that is covered by a lens 12 made of a material such as plastic or glass that the wearer can see through. The lens 12 will preferably be tinted so that the spectacles can be used as sunglasses for protection against sun glare. It can be attached to the lens holder in any convenient fashion, such as by an adhesive or by forming a pocket (not shown) in the holder into which the lens can be inserted.

In the embodiment of FIG. 1, the lens holder 10 also includes a front wall 13 and a rear wall 14 that are held in spaced relationship and that are connected at their lower edges by a member 15. The lens 12 is adhesively attached to the rear face of the front wall 13. The walls 13 and 14 and the member 15 are attractively shaped and their lower edges are curved in conventional fashion to enable the glasses to rest comfortably on the bridge of the nose of a user.

The space between walls 13 and 14 and below the lens 12 forms a pocket to receive the advertising plaques, shown generally at 16. A number of the plaques are pivotally mounted, in side-by-side relationship, on a pivot 17 at each side of the lens holder. A large portion 18 of each plaque which may be covered with a sales message, travel information, cartoon characters, or the like, then is adapted to rest in the pocket and a tab portion 19 protrudes from the pocket to serve as a lever actuator. Whenever a tab portion 19 is depressed the corresponding large portion 18 will be pivoted until it is above the lens holder and is easily viewed.

A pair of temple bars 20 are connected to the rear face of wall 14 at opposite sides of the lens holder and in conventional fashion these engage the head and/or ears of the user to hold the spectacles in place. As illustrated, the temple bars are formed integral with the rear wall of the lens holder, with a section 21 of reduced thickness, acting as a hinge. Obviously, the temple bars could as well be made separate and other conventional hinge structures can be used.

If desired, an advertising message 22, FIG. 1, can be imprinted on the front face of the wall 13.

In FIGS. 4 and 5, there is shown another embodiment of the invention, wherein plaques 24 rest in a pocket of a lens holder 25 made up of a front wall 26 and a rear wall 27. As in the previously disclosed embodiment, the plaques are pivoted on pivot pins 28 at opposite sides of the spactacles, and each plaque includes an enlarged portion 29 on which a desired message, etc. can be placed, and a tab 30 that projects from the lens holder to serve as a lever for pivoting the enlarged portion from a lowered, hidden position to a raised position where it can be easily viewed. Also, like in the previously described embodiment, a pair of temple bars 31 extend from the rear face of wall 27 at opposite sides of the spectacles, and a single lens 32 is adhesively positioned to cover a continuous opening 33 in wall 26, through which a user will be able to see.

In this embodiment, however, the opening 33 and lens 32 are positioned in the lower portion of the lens holder and the plaques, when in their lowered, hidden position, rest in the pocket formed between front and rear walls 26 and 27, respectively, on pins 34 that extend between the walls, above the lens.

FIGS. 6 and 7 show still another embodiment wherein the lens carrying frame includes a lens holder 36, with separate eye openings 37 and 38 that are covered by lenses 39 and 40, respectively. The lenses can be adhesively fixed, as shown, or they can be held in position in any other conventional manner.

A pair of temple bars 41 and 42 are respectively hinged to opposite sides of frame 36, in conventional fashion, so that they can project therefrom to hold the glasses in position during use.

Temple bar 41 is formed to have a pocket 43 therein that is open at its top. A pin 44 extends through the pocket to serve as a pivot axis, for a plaque 45. Plaque 45 has an enlarged message-bearing portion 46 adapted to rest in the pocket and a tab portion 47 that will normally protrude upwardly from the pocket. By applying pressure to the tab the plaque can be rotated until the large message-bearing portion is clearly visible.

As with the previously disclosed embodiments, a number of plaques can be aligned on the pin 44 and it should be obvious that temple bar 24 could as well be made to receive one or more plaques.

The invention provides novelty spectacles that include message-bearing portions that can be manipulated into and out of viewing position. The message-bearing portions are preferably plaques that can be pivoted from a hidden position inside the frame of the spectacles to an unobstructed viewing position. In some instances, frames, including pockets with plaques arranged therein, will be attached by clips, with an adhesive, or in some other suitable manner, to existing spectacles.

Whereas this invention is here described and illustrated with respect to certain forms thereof, it is understood that many variations are possible without departing from the subject matter particularly pointed out in the following claims, which subject matter I regard as my invention.

I claim:
1. Advertising spectacles comprising
   a lens-carrying frame;
   pocket means carried by said frame;
   at least one plaque carried by said frame and including a message-bearing portion adapted for movement into and out of said pocket; and
   means for moving said message-bearing portion into said pocket out of viewing position and out of said pocket into viewing position.
2. Advertising spectacles according to claim 1, wherein the lens-carrying frame includes a lens holder including at least one transparent covered opening through which a user can see, and
   temple bars connected to the lens holder at opposite sides thereof and adapted to project therefrom.
3. Advertising spectacles according to claim 2, including
   pivotal means mounting said plaque such that the message-bearing portion thereof is movable into and out of said pocket.
4. Advertising spectacles according to claim 3, wherein the pocket is in the lens holder portion of the frame.
5. Advertising spectacles according to claim 4, including
   a plurality of plaques, each having a large message-bearing portion and a smaller tab portion, said tab portion being adapted as lever actuator means for moving said message-bearing portion into and out of said pocket.
6. Advertising spectacles according to claim 3, wherein the pocket is in a temple bar of the frame.
7. Advertising spectacles according to claim 6, including
   a plurality of plaques, each having a large portion adapted to contain a message.

References Cited
UNITED STATES PATENTS

| | | | |
|---|---|---|---|
| 677,317 | 6/1901 | Macdonald | 40—67 |
| 2,721,498 | 10/1955 | Gerson | 351—158 |
| 2,798,320 | 7/1957 | Montalto | 40—67 |

EUGENE R. CAPOZIO, *Primary Examiner.*

WENCESLAO J. CONTRERAS, *Assistant Examiner.*

U.S. Cl. X.R.
351—158